Jan. 3, 1928.
E. D. EBY
1,655,261
CHAMBERED DIAPHRAGM
Filed April 23, 1927
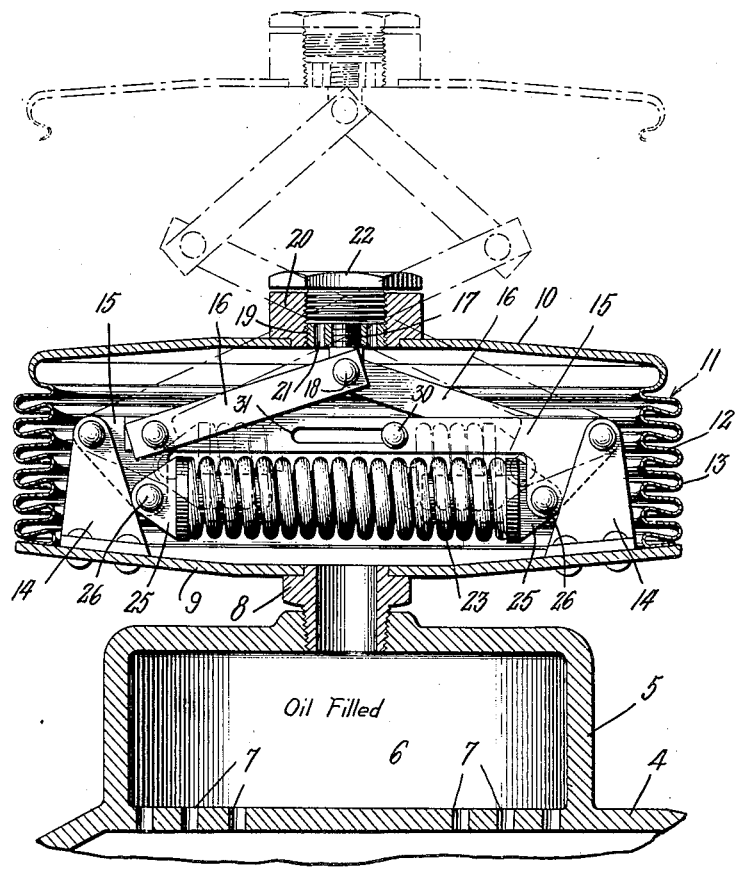
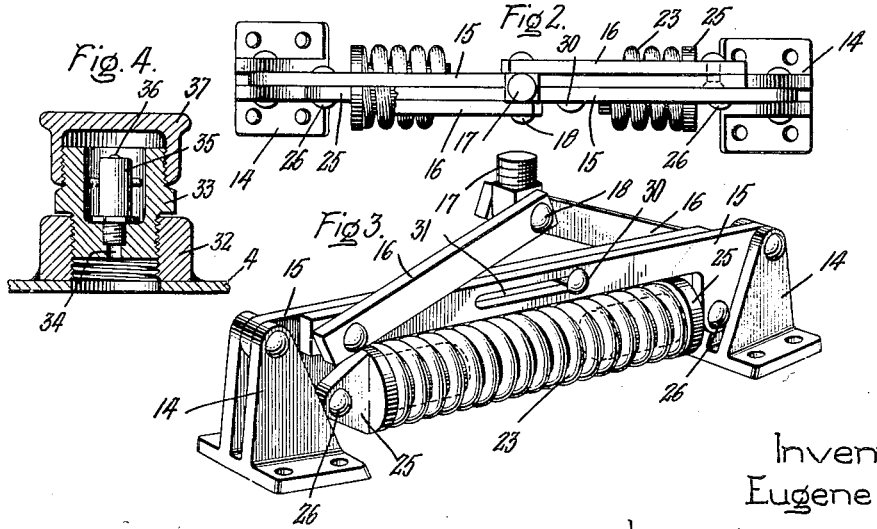
Inventor:
Eugene D. Eby,
by
His Attorney.

Patented Jan. 3, 1928.

1,655,261

UNITED STATES PATENT OFFICE.

EUGENE D. EBY, OF PITTSFIELD, MASSACHUSETTS, ASSIGNOR TO GENERAL ELECTRIC COMPANY, A CORPORATION OF NEW YORK.

CHAMBERED DIAPHRAGM.

Application filed April 23, 1927. Serial No. 186,161.

In operating high tension underground cables comprising a conductor, either solid or hollow, which is wrapped with a body of insulation, usually paper, and enclosed in a lead sheath, it is customary in many cases to fill them with oil to prevent the formation of voids or air pockets which are potential danger spots. As the temperature of the cable rises the oil expands and as it falls the oil contracts. To take care of this, it has been proposed to employ metallic diaphragms or reservoirs of the bellows type. In order to withstand the pressures to which the diaphragm is subjected, the walls thereof have to be of appreciable thickness and when so constructed offer a substantial resistance to movement with the result that under certain conditions a partial vacuum will exist within the diaphragm chamber which of course retards the flow of oil therefrom into the cable. It is also necessary in most cases to provide means for limiting the expansive movement of the diaphragm when it is subjected to relatively high pressure.

My invention relates to reservoir type diaphragms and especially to those intended for use with high tension electric cables, and has for its object to improve their construction to the end that any predetermined pressure may be maintained on the oil in the cable, and this by simple means which are located wholly within the diaphragm chamber where they are protected from injury.

For a consideration of what I believe to be novel and my invention, attention is directed to the accompanying description and the claims appended thereto.

In the drawing which is illustrative of my invention, Fig. 1 is a vertical section of a bellows diaphragm and part of the casing of a cable joint; Fig. 2 is a plan view of the mechanism which controls the action of the diaphragm; Fig. 3 is a perspective view of said mechanism, and Fig. 4 is a detail of a fitting whereby fluid may be admitted to the reservoir.

4 indicates the casing of a high tension cable joint, the details of the joint and of the cable itself being omitted as being unnecessary to an understanding of the invention. It is sufficient to say that the casing taken with the lead sheath of the cable forms an envelope for the conductor which is completely closed to avoid leakage of the oil therefrom or the admission of air.

The casing for the joint is arranged to support the diaphragm. In the present illustration the casing is provided with a housing 5 which has a chamber 6 that is filled with oil and from which it flows through numerous ports or passages 7 into the casing proper and into the cable. The housing has a screw threaded opening at the top into which is screwed an apertured nipple 8. The nipple in addition to acting as an oil conduit forms the support for the diaphragm and the two parts are united by solder or equivalent means.

The bottom or base 9 of the diaphragm is made of sheet metal stock of suitable thickness to form a support for the regulating mechanism. The top wall 10 of the diaphragm is also made of sheet metal of suitable thickness and has a filling aperture. The annular wall 11 which connects the top and bottom supporting walls is made of relatively thin elastic metal which, however, is tough enough to withstand the demands thereon without cracking. In order to give flexibility to the wall it is provided with deep corrugations 12 and the connecting bends 13 are well rounded. The ends of the vertical wall are firmly secured to the top and bottom walls as by soldering or brazing.

Located within the chamber of the diaphragm and secured to the bottom wall by rivets or other means are two vertical posts or supports 14. In these posts are pivotally supported bell crank levers 15, the free or outer ends of the long arms of which are pivotally connected by links 16 to a screw-threaded stud 17 through pin 18. The stud is mounted in a screw-threaded member 19 which is located in the boss 20, the latter being soldered to the top wall 10 of the diaphragm. The member 19 has openings 21 through which oil can be supplied to the interior of the diaphragm and to the cable. Under normal conditions the diaphragm chamber is practically filled with oil, the quantity of course depending upon the conditions within the cable. A screw plug 22 serves to close the diaphragm chamber. The bell crank levers are so positioned that the long arms thereof are in overlapping relation, see Fig. 3 particularly, and the links 16 extend toward each other to the point of connection with the stud 17. As a result of this arrangement the structure is exceedingly compact and hence the diaphragm may be of relatively small diameter. As these diaphragms are commonly placed in manholes or other restricted places, it is important that any regulating mechanism associated therewith be placed inside the diaphragm chamber to protect it from injury and from dirt, moisture, etc. The fact that said chamber is largely or wholly filled with oil results in complete lubrication of the parts and ensures proper operation at all times.

Extending horizontally across the bottom of the chamber is a coiled compression spring 23, the ends of which engage spring holders 24. Each of these holders has a head, on one side of which is a plug that fits the inside of the spring and on the other side a flat sided projection 25, the latter being connected to the short arm of a bell crank lever by the pivot pin 26. The spring is located in the space defined by the posts 14 and the under sides of the long arms of the bell crank levers. This arrangement conserves space thereby rendering the parts more compact. As shown the spring tends at all times to exert pressure on the bell crank lever and links in a direction to collapse the diaphragm and thereby cause pressure to be exerted on the oil therein and also in the regions beyond. As the pressure increases due to heating of the oil or other cause the top wall 10 of the diaphragm will move upward as indicated in broken and dotted lines, Fig. 1, thereby compressing the spring 23 and increasing its tension. The spring is so selected that even when fully expanded as in Fig. 1 it exerts sufficient pressure to ovecome the resistances of the bellows and thus cause oil to be fed therefrom into the cable. Without such a spring, assuming atmospheric pressure in operation, a partial vacuum would be created within the diaphragm on contraction of the oil before the difference of pressure on the two sides of the top wall would be great enough to move it downward. By proper design of the parts an approximately constant downward pull on the head 10 may be obtained. This will be determined chiefly by the size and elasticity of the spring and the length and arrangement of the lever arms. To ensure the best operation of the cable the oil therein should always be under a pressure above that of the atmosphere.

It sometimes happens with a metal bellows diaphragm of the type illustrated when exposed to internal pressure that the movable or top part, as in the present illustration, does not maintain its proper parallel relation to the stationary or bottom part due to a difference in the elasticity of the cylindrical wall in different regions. To overcome this and to ensure the proper parallel relation of the top and bottom parts in all positions a guide pin 30 is provided which is mounted in one of the horizontal levers 15 and which moves in a slot 31 in the companion lever, the walls of said slot making a freely sliding fit with the surface of the pin. Such an arrangement in addition to preventing unequal expansion or movement of the parts of the cylindrical wall also serves to preserve the proper relation of the various levers and associated parts.

In Fig. 4 is shown another means for introducing oil into the diaphragm and also into the casing with which it is connected. It may be used alone or in connection with the diaphragm filling means previously described. In this figure, 4 indicates a part of the casing which surrounds the cable joint. Secured thereto by any suitable means as by soldering or brazing is a ring member 32 which is internally threaded to receive a screw-threaded plug 33, the latter having an oil feeding passage 34 which is in communication with a fitting 35 containing a spring seated ball valve 36, said ball yielding inwardly when oil under pressure is supplied thereto by a pump or other pressure-producing means. As an illustration of this I may use an ordinary alemite fitting for the purpose. After the necessary amount of oil is fed into the casing and diaphragm the valve 36 automatically closes and the fitting is sealed by a screw-threaded cap 37.

What I claim as new and desire to secure by Letters Patent of the United States is:

1. In a chambered diaphragm, the combination of supporting walls, an elastic wall which connects them, a spring located within the chamber, a system of overlapping levers carried by one of the supporting walls which engage the spring and are acted upon by it in a manner tending at all times to move the supporting walls toward each other, and a means for connecting the outer ends of the levers to the other of said supporting walls.

2. In a chambered diaphragm, the combination of supporting walls, an elastic wall which connects them, a pair of fixed supports mounted on one of the supporting walls within the chamber, a transversely extending spring situated between and carried by the supports, overlapping levers which are actuated by the spring, links which are moved by the levers, and a means for pivotally connecting the links to the other of the supporting walls.

3. In a chambered diaphragm, the combination of supporting walls, an elastic metal wall which connects them, a pair of posts mounted on one of the supporting walls within the chamber, a bell crank lever pivotally mounted on each post, links which are pivotally connected to the other of the supporting walls and to arms of the bell crank levers, and a spring which is supported by the levers and acts thereon in a manner to move the supporting walls toward each other.

4. In a chambered diaphragm, the combination of supporting walls, an elastic metal wall which connects them, a pair of posts mounted on one of the supporting walls within the chamber, a bell crank lever pivotally mounted on each post, having a long and a short arm, links which are pivotally connected to the long arms of the levers and to the other of said supporting walls, holders which are pivotally mounted on the short arms of the levers, and a coiled compression spring which is supported at its ends by the holders and exerts pressure on the levers in a direction to cause the supporting walls to move toward each other.

5. In a chambered diaphragm, the combination of supporting walls, an elastic metal wall which connects them, a pair of fixed supports mounted on one of the supporting walls, a bell crank lever pivotally mounted in each support and having long and short arms, the long arms being in overlapping relation, a coiled compression spring which is situated in the space defined by the supports and the undersides of said long arms, spring holders which engage the opposite ends of the spring, pivots for connecting the holders to the short arms of said levers, links which receive motion from the levers and communicate it to the other of the supporting walls, and a means connecting the link to said wall.

6. In a chambered diaphragm, the combination of supporting walls, both of which are apertured, an elastic metal wall which connects them, lever and spring means located within the chamber which tend to move the supporting walls toward each other, a means located in the aperture in one of the walls which is attached to said moving means, and through which fluid may be supplied to the chamber, and a plug for closing the aperture in which said means is located.

7. In a chambered diaphragm, the combination of members arranged in parallel relation, an annular elastic wall which connects them, the internal chamber thus formed being subjected to fluid pressure, a system of levers which connects the two members, spring means acting on the levers in a manner to cause them to move the members with respect to each other, and means for maintaining the parallel relation of the members as they are moved in response to the action of the levers and fluid pressure.

In witness whereof, I have hereunto set my hand this 18th day of April, 1927.

EUGENE D. EBY.